United States Patent
Kim et al.

(10) Patent No.: US 10,919,543 B2
(45) Date of Patent: Feb. 16, 2021

(54) LEARNING METHOD AND LEARNING DEVICE FOR DETERMINING WHETHER TO SWITCH MODE OF VEHICLE FROM MANUAL DRIVING MODE TO AUTONOMOUS DRIVING MODE BY PERFORMING TRAJECTORY-BASED BEHAVIOR ANALYSIS ON RECENT DRIVING ROUTE

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,833

(22) Filed: Dec. 23, 2019

(65) Prior Publication Data
US 2020/0239029 A1    Jul. 30, 2020

Related U.S. Application Data

(60) Provisional application No. 62/798,637, filed on Jan. 30, 2019.

(51) Int. Cl.
*B60W 60/00* (2020.01)
*H04W 4/40* (2018.01)
(Continued)

(52) U.S. Cl.
CPC .... *B60W 60/0059* (2020.02); *B60W 30/0956* (2013.01); *B60W 60/0015* (2020.02);
(Continued)

(58) Field of Classification Search
USPC .................. 701/23–28, 300–302, 400–541; 348/113–116, 118–119
See application file for complete search history.

(56) References Cited

U.S. PATENT DOCUMENTS 9,594,725 B1 * 3/2017 Cook ................. G06F 3/0482
10,007,269 B1 * 6/2018 Gray ................. G06K 9/6277
(Continued)

FOREIGN PATENT DOCUMENTS

EP    3272611 A1    1/2018

*Primary Examiner* — Jonathan L Sample
(74) *Attorney, Agent, or Firm* — Husch Blackwell LLP (57) ABSTRACT

A learning method for calculating collision probability, to be used for determining whether it is appropriate or not to switch driving modes of a vehicle capable of an autonomous driving, by analyzing a recent driving route of a driver is provided. And the method includes steps of: (a) a learning device, on condition that a status vector and a trajectory vector are acquired, performing processes of (i) instructing a status network to generate a status feature map and (ii) instructing a trajectory network to generate a trajectory feature map; (b) the learning device instructing a safety network to calculate a predicted collision probability repre-
(Continued)

senting a predicted probability of an accident occurrence; and (c) the learning device instructing a loss layer to generate a loss by referring to the predicted collision probability and a GT collision probability, which have been acquired beforehand, to learn at least part of parameters.

18 Claims, 3 Drawing Sheets

(51) Int. Cl.
  *B60W 30/095* (2012.01)
  *G06K 9/00* (2006.01)
  *G06K 9/62* (2006.01)
  *G06N 3/04* (2006.01)
  *G06N 3/08* (2006.01)

(52) U.S. Cl.
  CPC ....... *G06K 9/00791* (2013.01); *G06K 9/6232* (2013.01); *G06N 3/0454* (2013.01); *G06N 3/08* (2013.01); *H04W 4/40* (2018.02); *B60W 60/00* (2020.02); *B60W 60/001* (2020.02); *B60W 60/005* (2020.02); *B60W 60/0011* (2020.02); *B60W 60/0051* (2020.02); *B60W 60/0053* (2020.02)

(56) References Cited

U.S. PATENT DOCUMENTS

| | | | | |
|---|---|---|---|---|
| 10,133,275 | B1* | 11/2018 | Kobilarov | G05D 1/0088 |
| 10,599,155 | B1* | 3/2020 | Konrardy | G07C 5/08 |
| 2007/0005609 | A1* | 1/2007 | Breed | B60N 2/2863 |
| 2007/0021915 | A1* | 1/2007 | Breed | G08G 1/164 |
| | | | | 701/301 |
| 2017/0053461 | A1* | 2/2017 | Pal | G06N 7/005 |
| 2017/0135621 | A1* | 5/2017 | Lee | A61B 3/10 |
| 2018/0089563 | A1* | 3/2018 | Redding | G06N 3/006 |
| 2018/0107215 | A1* | 4/2018 | Djuric | G06N 3/04 |
| 2018/0126986 | A1* | 5/2018 | Kim | B60W 30/09 |
| 2018/0143646 | A1* | 5/2018 | Suk | G05D 1/0088 |
| 2018/0147988 | A1* | 5/2018 | Lee | G01C 21/3685 |
| 2018/0209801 | A1* | 7/2018 | Stentz | G01C 21/3415 |
| 2018/0281785 | A1* | 10/2018 | Berntorp | G08G 1/166 |
| 2018/0284785 | A1* | 10/2018 | Berntorp | B60W 30/08 |
| 2018/0300964 | A1* | 10/2018 | Lakshamanan | G01C 21/3492 |
| 2018/0341276 | A1* | 11/2018 | Kislovskiy | G06Q 10/04 |
| 2018/0341571 | A1* | 11/2018 | Kislovskiy | G06F 8/65 |
| 2018/0342035 | A1* | 11/2018 | Sweeney | G08G 1/202 |
| 2018/0365888 | A1* | 12/2018 | Satzoda | G06N 3/0454 |
| 2019/0025842 | A1* | 1/2019 | Kim | G05D 1/0061 |
| 2019/0135283 | A1* | 5/2019 | Bonk | G08G 1/0112 |
| 2019/0155290 | A1* | 5/2019 | Luo | B60W 30/00 |
| 2019/0359205 | A1* | 11/2019 | Xu | G05D 1/0253 |
| 2019/0362198 | A1* | 11/2019 | Averbuch | G01S 7/41 |
| 2019/0389459 | A1* | 12/2019 | Berntorp | B60W 30/18145 |
| 2019/0391585 | A1* | 12/2019 | Zhang | G01C 21/00 |
| 2020/0055515 | A1* | 2/2020 | Herman | G06K 9/00805 |
| 2020/0086855 | A1* | 3/2020 | Packer | G08G 1/161 |
| 2020/0167575 | A1* | 5/2020 | Nayak | G06N 20/00 |
| 2020/0174481 | A1* | 6/2020 | Van Heukelom | G05D 1/0088 |
| 2020/0211394 | A1* | 7/2020 | King | G05D 1/0289 |

* cited by examiner

LEARNING METHOD AND LEARNING DEVICE FOR DETERMINING WHETHER TO SWITCH MODE OF VEHICLE FROM MANUAL DRIVING MODE TO AUTONOMOUS DRIVING MODE BY PERFORMING TRAJECTORY-BASED BEHAVIOR ANALYSIS ON RECENT DRIVING ROUTE

CROSS REFERENCE OF RELATED APPLICATION

This application claims the benefit of priority to U.S. Provisional Patent Application No. 62/798,637, filed Jan. 30, 2019, the entire contents of which are incorporated herein by reference.

FIELD OF THE DISCLOSURE

The present disclosure relates to a learning method and a learning device for use with an autonomous vehicle; and more particularly, to the learning method and the learning device for determining whether to switch a mode of a vehicle from a manual driving mode to an autonomous driving mode by performing a trajectory-based behavior analysis on recent driving route, and a testing method and a testing device using the same.

BACKGROUND OF THE DISCLOSURE

In autonomous driving, a mode switching is an important issue. This is because, when it becomes dangerous while a driver drives a vehicle manually, the mode of the vehicle should be automatically changed to an autonomous driving mode. However, studies on the autonomous driving up to now have focused mainly on how well the vehicle is driven, and there is not much study on how such mode switching can be efficiently achieved. Further, in general, there is a problem that because a mode of the vehicle is switched manually, the vehicle cannot be operated in the autonomous driving mode even if the driver drives recklessly and endangers surrounding vehicles.

SUMMARY OF THE DISCLOSURE

It is an object of the present disclosure to solve all the aforementioned problems.

It is an object of the present disclosure to provide a learning method for analyzing a recent driving route of a driver, to thereby calculate a collision probability.

It is another object of the present disclosure to provide a learning method for calculating a collision probability by analyzing a recent driving route of a driver, to thereby determine whether the driver is driving dangerously or not by referring to the collision probability.

It is still another object of the present disclosure to improve a road circumstance by providing a method for switching a mode of a vehicle from a manual driving mode to an autonomous driving mode if a driver drives recklessly.

In accordance with one aspect of the present disclosure, there is provided a learning method for calculating collision probability, to be used for determining whether it is appropriate or not to switch driving modes of a vehicle capable of an autonomous driving, by analyzing a recent driving route of a driver with regard to a circumstance of its corresponding time range, including steps of: (a) a learning device, on condition that (i) at least one status vector, corresponding to at least one piece of circumstance information for verification including at least part of (i-1) at least one piece of subject motion information on at least one subject vehicle and (i-2) one or more pieces of surrounding motion information on at least part of one or more surrounding objects located closer than a threshold from the subject vehicle, in a subject time range for verification from a first timing to a T-th timing, and (ii) at least one trajectory vector, corresponding to at least one piece of route information for verification on at least one driving route driven by the subject vehicle in the subject time range for verification, are acquired, performing processes of (i) instructing a status network to apply at least one first neural network operation to the status vector, to thereby generate at least one status feature map and (ii) instructing a trajectory network to apply at least one second neural network operation to the trajectory vector, to thereby generate at least one trajectory feature map; (b) the learning device, if at least one concatenated feature map corresponding to the status feature map and the trajectory feature map is acquired, instructing a safety network to apply at least one third neural network operation to the concatenated feature map, to thereby calculate at least one predicted collision probability representing a predicted probability of an occurrence of at least one accident caused by the driving route indicated by the route information for verification with regard to a circumstance indicated by the circumstance information for verification; and (c) the learning device instructing a loss layer to generate at least one loss by referring to the predicted collision probability and at least one Ground-Truth (GT) collision probability, which have been acquired beforehand, and to perform backpropagation by using the loss, to thereby learn at least part of parameters of the safety network, the trajectory network and the status network.

As one example, at the step of (a), the learning device instructs (i) at least one first convolutional layer of the status network to generate at least one (1-1)-st feature map by applying at least one first convolutional operation to the status vector, (ii) at least one first pooling layer of the status network to generate at least one (1-2)-nd feature map by applying at least one first pooling operation to the (1-1)-st feature map, and (iii) at least one first Fully-Connected (FC) layer to generate the status feature map by applying at least one first FC operation to the (1-2)-nd feature map.

As one example, at the step of (a), the learning device instructs (i) at least one second convolutional layer of the trajectory network to generate at least one (2-1)-st feature map by applying at least one second convolutional operation to the trajectory vector, (ii) at least one second pooling layer of the trajectory network to generate at least one (2-2)-nd feature map by applying at least one second pooling operation to the (2-1)-st feature map, and (iii) at least one second Fully-Connected (FC) layer to generate the trajectory feature map by applying at least one second FC operation to the (2-2)-nd feature map.

As one example, at the step of (b), the learning device instructs (i) at least one concatenating layer to generate the concatenated feature map by concatenating the status feature map and the trajectory feature map, (ii) at least one third convolutional layer of the safety network to generate at least one (3-1)-st feature map by applying at least one third convolutional operation to the concatenated feature map, (iii) at least one third pooling layer of the safety network to generate at least one (3-2)-nd feature map by applying at least one third pooling operation to the (3-1)-st feature map, and (iv) at least one third Fully-Connected (FC) layer to generate the predicted collision probability by applying at least one third FC operation to the (3-2)-nd feature map.

As one example, before the step of (a), the method further includes a step of: (a0) the learning device communicating with at least one basement server interworking with the subject vehicle, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the basement server, (ii) generating the trajectory vector by using the route information for verification, corresponding to the driving route of the subject vehicle on a region map for verification during the subject time range for verification, which has been acquired from the basement server, and (iii) acquiring the GT collision probability by using at least one piece of accident information on whether the subject vehicle has had at least one accident in an attention time range from a (T+1)-th timing to a (T+K)-th timing or not, which has been acquired from the basement server, wherein K is at least one arbitrary integer.

As one example, before the step of (a), the method further includes a step of: (a1) the learning device performs processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by referring to at least one driving video recorded through at least one subject camera on the subject vehicle during the subject time range for verification, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicles has had at least one accident in an attention time range from a (T+1)-th timing to a (T+K)-th timing or not, which has been acquired by referring to the driving record information, wherein K is at least one arbitrary integer.

As one example, before the step of (a), the method further includes a step of: (a2) the learning device performs processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by using at least one V2X communication module installed to the subject vehicle, to be used for communicating with said at least part of the surrounding vehicles, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicle has had at least one accident in an attention time range from a (T+1)-th timing to a (T+K)-th timing or not, which has been acquired by referring to the driving record information, wherein K is at least one arbitrary integer.

As one example, before the step of (a), the method further includes a step of: (a3) the learning device communicating with at least one simulating device simulating at least one virtual world including the subject vehicle and the surrounding objects, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the simulating device, (ii) generating the trajectory vector by referring to the route information for verification, corresponding to the driving route of the subject vehicle on a region map for verification during the subject time range for verification, which has been acquired from the simulating device, and (iii) acquiring the GT collision probability by using at least one piece of accident information on whether the subject vehicle has had at least one accident in an attention time range from a (T+1)-th timing to a (T+K)-th timing or not, which has been acquired from the simulating device, wherein K is at least one arbitrary integer.

As one example, the subject motion information includes at least part of (i-1) at least one piece of subject location information of the subject vehicle, (i-2) at least one piece of subject velocity information thereof, and (i-3) at least one piece of subject acceleration information thereof, and wherein the surrounding motion information includes at least part of (ii-1) at least one piece of surrounding location information of at least part of the surrounding objects, (ii-2) at least one piece of surrounding velocity information thereof, and (ii-3) at least one piece of surrounding acceleration information thereof.

In accordance with another aspect of the present disclosure, there is provided a testing method for calculating collision probability, to be used for determining whether it is appropriate or not to switch driving modes of a vehicle capable of an autonomous driving, by analyzing a recent driving route of a driver with regard to a circumstance of its corresponding time range, including steps of: (a) on condition that (1) a learning device, if (i) at least one status vector for training, corresponding to at least one piece of circumstance information for verification for training including at least part of (i-1) at least one piece of subject motion information for training on at least one subject vehicle for training and (i-2) one or more pieces of surrounding motion information for training on at least part of one or more surrounding objects for training located closer than a threshold from the subject vehicle for training, in a subject time range for verification for training from a first timing to a T-th timing, and (ii) at least one trajectory vector for training, corresponding to at least one piece of route information for verification for training on at least one driving route for training driven by the subject vehicle for training in the subject time range for verification for training, have been acquired, has performed processes of (i) instructing a status network to apply at least one first neural network operation to the status vector for training, to thereby generate at least one status feature map for training and (ii) instructing a trajectory network to apply at least one second neural network operation to the trajectory vector for training, to thereby generate at least one trajectory feature map for training; (2) the learning device, if at least one concatenated feature map for training corresponding to the status feature map for training and the trajectory feature map for training has been acquired, has instructed a safety network to apply at least one third neural network operation to the concatenated feature map for training, to thereby calculate at least one predicted collision probability for training representing a predicted probability for training of an occurrence of at least one accident for training caused by the driving route for training indicated by the route information for verification for training with regard to a circumstance for training indicated by the circumstance information for verification for training; and (3) the learning device has instructed a loss layer to generate at least one loss by referring to the predicted collision probability for training and at least one Ground-Truth (GT) collision probability, which have been acquired beforehand, and to perform backpropagation by using the loss, to thereby learn at least part of parameters of the safety network, the trajectory network and the status network, a testing device, if (i) at least one status vector for testing, corresponding to at least one piece of test circumstance information for verification including at least part of (i-1) at least one piece of subject motion information for testing on at least one subject vehicle for testing and (i-2) one or more pieces of surrounding motion information for testing on at least part of one or more surrounding objects for testing located closer than the threshold from the subject vehicle for testing, in a test subject time range for verification from a 1'-st timing to a T'-th timing, and (ii) at least one trajectory vector for testing, corresponding to at least one piece of test route information for verification on at least one driving route for testing driven by the subject vehicle for testing in the test subject time range for verification, have been acquired, performing processes of (i) instructing the status network to apply said at least one first neural network operation to the status vector for testing, to thereby generate at least one status feature map for testing and (ii) instructing the trajectory network to apply said at least one second neural network operation to the trajectory vector for testing, to thereby generate at least one trajectory feature map for testing; (b) the testing device, if at least one concatenated feature map for testing corresponding to the status feature map for testing and the trajectory feature map for testing has been acquired, instructing the safety network to apply said at least one third neural network operation to the concatenated feature map for testing, to thereby calculate at least one predicted collision probability for testing representing a predicted probability for testing of an occurrence of at least one accident for testing caused by the driving route for testing indicated by the test route information for verification with regard to a circumstance for testing indicated by the test circumstance information for verification.

As one example, the testing device communicates with at least one basement server for testing interworking with the subject vehicle for testing, to perform processes of (i) generating the status vector for testing by using the test circumstance information for verification, including (i-1) at least one piece of subject location information for testing of the subject vehicle for testing, (i-2) at least one piece of subject velocity information for testing thereof, (i-3) at least one piece of surrounding location information for testing of at least part of surrounding vehicles for testing among the surrounding objects for testing and (i-4) at least one piece of surrounding velocity information for testing thereof, corresponding to the test subject time range for verification, which have been acquired from the basement server for testing, and (ii) generating the trajectory vector for testing by referring to the test route information for verification, corresponding to the driving route for testing of the subject vehicle for testing on a test region map for verification during the test subject time range for verification, which has been acquired from the basement server for testing.

As one example, at the step of (a), the testing device performs processes of (i) generating the status vector for testing by using the test circumstance information for verification corresponding to the test subject time range for verification, including (i-1) at least one piece of subject location information for testing of the subject vehicle for testing and (i-2) at least one piece of subject velocity information for testing thereof, which have been acquired from at least one of a GPS for testing and a velocity control unit for testing included in the subject vehicle for testing, and (i-3) at least one piece of surrounding location information for testing of at least part of surrounding vehicles for testing among the surrounding objects for testing and (i-4) at least one piece of surrounding velocity information for testing thereof, which have been acquired by referring to at least one driving video for testing recorded through at least one subject camera for testing on the subject vehicle for testing during the test subject time range for verification, and (ii) generating the trajectory vector for testing by referring to the test route information for verification, corresponding to the driving route for testing of the subject vehicle for testing on a test region map for verification during the test subject time range for verification, which has been acquired from a planning unit for testing included in the subject vehicle for testing.

As one example, at the step of (b), the testing device performs processes of (i) generating the status vector for testing by using the test circumstance information for verification corresponding to the test subject time range for verification, including (i-1) at least one piece of subject location information for testing of the subject vehicle for testing and (i-2) at least one piece of subject velocity information for testing thereof, which have been acquired from at least one of a GPS for testing and a velocity control unit for testing included in the subject vehicle for testing, and (i-3) at least one piece of surrounding location information for testing of at least part of surrounding vehicles for testing among the surrounding objects for testing and (i-4) at least one piece of surrounding velocity information for testing thereof, which have been acquired by using a V2X communication module for testing included in the subject vehicle of testing during the test subject time range for verification, and (ii) generating the trajectory vector for testing by referring to the test route information for verification, corresponding to the driving route for testing of the subject vehicle for testing on a test region map for verification during the test subject time range for verification, which has been acquired from a planning unit for testing included in the subject vehicle for testing.

As one example, the method further comprises a step of: (c) the testing device, if the predicted collision probability for testing is larger than a threshold and a driving mode of the subject vehicle for testing corresponds to a manual driving mode, instructing the subject vehicle for testing to switch its driving mode to an autonomous driving mode.

In accordance with still another aspect of the present disclosure, there is provided a learning device for calculating collision probability, to be used for determining whether it is appropriate or not to switch driving modes of a vehicle capable of an autonomous driving, by analyzing a recent driving route of a driver with regard to a circumstance of its corresponding time range, including: at least one memory that stores instructions; and at least one processor configured to execute the instructions to perform processes of: (I) on condition that (i) at least one status vector, corresponding to at least one piece of circumstance information for verification including at least part of (i-1) at least one piece of subject motion information on at least one subject vehicle and (i-2) one or more pieces of surrounding motion information on at least part of one or more surrounding objects located closer than a threshold from the subject vehicle, in a subject time range for verification from a first timing to a T-th timing, and (ii) at least one trajectory vector, corresponding to at least one piece of route information for verification on at least one driving route driven by the subject vehicle in the subject time range for verification, are acquired, performing processes of (i) instructing a status network to apply at least one first neural network operation to the status vector, to thereby generate at least one status feature map and (ii) instructing a trajectory network to apply at least one second neural network operation to the trajectory vector, to thereby generate at least one trajectory feature map; (II) if at least one concatenated feature map corresponding to the status feature map and the trajectory feature map is acquired, instructing a safety network to apply at least one third neural network operation to the concatenated feature map, to thereby calculate at least one predicted collision probability representing a predicted probability of an occurrence of at least one accident caused by the driving route indicated by the route information for verification with regard to a circumstance indicated by the circumstance information for verification; and (III) instructing a loss layer to generate at least one loss by referring to the predicted collision probability and at least one Ground-Truth (GT) collision probability, which have been acquired beforehand, and to perform backpropagation by using the loss, to thereby learn at least part of parameters of the safety network, the trajectory network and the status network.

As one example, at the process of (I), the processor instructs (i) at least one first convolutional layer of the status network to generate at least one (1-1)-st feature map by applying at least one first convolutional operation to the status vector, (ii) at least one first pooling layer of the status network to generate at least one (1-2)-nd feature map by applying at least one first pooling operation to the (1-1)-st feature map, and (iii) at least one first Fully-Connected (FC) layer to generate the status feature map by applying at least one first FC operation to the (1-2)-nd feature map.

As one example, at the process of (I), the processor instructs (i) at least one second convolutional layer of the trajectory network to generate at least one (2-1)-st feature map by applying at least one second convolutional operation to the trajectory vector, (ii) at least one second pooling layer of the trajectory network to generate at least one (2-2)-nd feature map by applying at least one second pooling operation to the (2-1)-st feature map, and (iii) at least one second Fully-Connected (FC) layer to generate the trajectory feature map by applying at least one second FC operation to the (2-2)-nd feature map.

As one example, at the process of (II), the processor instructs (i) at least one concatenating layer to generate the concatenated feature map by concatenating the status feature map and the trajectory feature map, (ii) at least one third convolutional layer of the safety network to generate at least one (3-1)-st feature map by applying at least one third convolutional operation to the concatenated feature map, (iii) at least one third pooling layer of the safety network to generate at least one (3-2)-nd feature map by applying at least one third pooling operation to the (3-1)-st feature map, and (iv) at least one third Fully-Connected (FC) layer to generate the predicted collision probability by applying at least one third FC operation to the (3-2)-nd feature map.

As one example, before the process of (I), the processor further performs a process of: (I0) communicating with at least one basement server interworking with the subject vehicle, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the basement server, (ii) generating the trajectory vector by using the route information for verification, corresponding to the driving route of the subject vehicle on a region map for verification during the subject time range for verification, which has been acquired from the basement server, and (iii) acquiring the GT collision probability by using at least one piece of accident information on whether the subject vehicle has had at least one accident in an attention time range from a (T+1)-th timing to a (T+K)-th timing or not, which has been acquired from the basement server, wherein K is at least one arbitrary integer.

As one example, before the process of (I), the processor further performs a process of: (I1) performing processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by referring to at least one driving video recorded through at least one subject camera on the subject vehicle during the subject time range for verification, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicles has had at least one accident in an attention time range from a (T+1)-th timing to a (T+K)-th timing or not, which has been acquired by referring to the driving record information, wherein K is at least one arbitrary integer.

As one example, before the process of (I), the processor further performs a process of: (I2) performing processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by using at least one V2X communication module installed to the subject vehicle, to be used for communicating with said at least part of the surrounding vehicles, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicle has had at least one accident in an attention time range from a (T+1)-th timing to a (T+K)-th timing or not, which has been acquired by referring to the driving record information, wherein K is at least one arbitrary integer.

As one example, before the process of (I), the processor further performs a process of: (I3) communicating with at least one simulating device simulating at least one virtual world including the subject vehicle and the surrounding objects, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the simulating device, (ii) generating the trajectory vector by referring to the route information for verification, corresponding to the driving route of the subject vehicle on a region map for verification during the subject time range for verification, which has been acquired from the simulating device, and (iii) acquiring the GT collision probability by using at least one piece of accident information on whether the subject vehicle has had at least one accident in an attention time range from a (T+1)-th timing to a (T+K)-th timing or not, which has been acquired from the simulating device, wherein K is at least one arbitrary integer.

As one example, the subject motion information includes at least part of (i-1) at least one piece of subject location information of the subject vehicle, (i-2) at least one piece of subject velocity information thereof, and (i-3) at least one piece of subject acceleration information thereof, and wherein the surrounding motion information includes at least part of (ii-1) at least one piece of surrounding location information of at least part of the surrounding objects, (ii-2) at least one piece of surrounding velocity information thereof, and (ii-3) at least one piece of surrounding acceleration information thereof.

In accordance with still yet another aspect of the present disclosure, there is provided a testing device for calculating collision probability, to be used for determining whether it is appropriate or not to switch driving modes of a vehicle capable of an autonomous driving, by analyzing a recent driving route of a driver with regard to a circumstance of its corresponding time range, including: at least one memory that stores instructions; and at least one processor configured to execute the instructions to perform processes of: (I) on condition that (1) a learning device, if (i) at least one status vector for training, corresponding to at least one piece of circumstance information for verification for training including at least part of (i-1) at least one piece of subject motion information for training on at least one subject vehicle for training and (i-2) one or more pieces of surrounding motion information for training on at least part of one or more surrounding objects for training located closer than a threshold from the subject vehicle for training, in a subject time range for verification for training from a first timing to a T-th timing, and (ii) at least one trajectory vector for training, corresponding to at least one piece of route information for verification for training on at least one driving route for training driven by the subject vehicle for training in the subject time range for verification for training, have been acquired, has performed processes of (i) instructing a status network to apply at least one first neural network operation to the status vector for training, to thereby generate at least one status feature map for training and (ii) instructing a trajectory network to apply at least one second neural network operation to the trajectory vector for training, to thereby generate at least one trajectory feature map for training; (2) the learning device, if at least one concatenated feature map for training corresponding to the status feature map for training and the trajectory feature map for training has been acquired, has instructed a safety network to apply at least one third neural network operation to the concatenated feature map for training, to thereby calculate at least one predicted collision probability for training representing a predicted probability for training of an occurrence of at least one accident for training caused by the driving route for training indicated by the route information for verification for training with regard to a circumstance for training indicated by the circumstance information for verification for training; and (3) the learning device has instructed a loss layer to generate at least one loss by referring to the predicted collision probability for training and at least one Ground-Truth (GT) collision probability, which have been acquired beforehand, and to perform backpropagation by using the loss, to thereby learn at least part of parameters of the safety network, the trajectory network and the status network, if (i) at least one status vector for testing, corresponding to at least one piece of test circumstance information for verification including at least part of (i-1) at least one piece of subject motion information for testing on at least one subject vehicle for testing and (i-2) one or more pieces of surrounding motion information for testing on at least part of one or more surrounding objects for testing located closer than the threshold from the subject vehicle for testing, in a test subject time range for verification from a 1'-st timing to a T'-th timing, and (ii) at least one trajectory vector for testing, corresponding to at least one piece of test route information for verification on at least one driving route for testing driven by the subject vehicle for testing in the test subject time range for verification, have been acquired, performing processes of (i) instructing the status network to apply said at least one first neural network operation to the status vector for testing, to thereby generate at least one status feature map for testing and (ii) instructing the trajectory network to apply said at least one second neural network operation to the trajectory vector for testing, to thereby generate at least one trajectory feature map for testing; (II) if at least one concatenated feature map for testing corresponding to the status feature map for testing and the trajectory feature map for testing has been acquired, instructing the safety network to apply said at least one third neural network operation to the concatenated feature map for testing, to thereby calculate at least one predicted collision probability for testing representing a predicted probability for testing of an occurrence of at least one accident for testing caused by the driving route for testing indicated by the test route information for verification with regard to a circumstance for testing indicated by the test circumstance information for verification.

As one example, at the process of (I), the processor communicates with at least one basement server for testing interworking with the subject vehicle for testing, to perform processes of (i) generating the status vector for testing by using the test circumstance information for verification, including (i-1) at least one piece of subject location information for testing of the subject vehicle for testing, (i-2) at least one piece of subject velocity information for testing thereof, (i-3) at least one piece of surrounding location information for testing of at least part of surrounding vehicles for testing among the surrounding objects for testing and (i-4) at least one piece of surrounding velocity information for testing thereof, corresponding to the test subject time range for verification, which have been acquired from the basement server for testing, and (ii) generating the trajectory vector for testing by referring to the test route information for verification, corresponding to the driving route for testing of the subject vehicle for testing on a test region map for verification during the test subject time range for verification, which has been acquired from the basement server for testing.

As one example, at the process of (I), the processor performs processes of (i) generating the status vector for testing by using the test circumstance information for verification corresponding to the test subject time range for verification, including (i-1) at least one piece of subject location information for testing of the subject vehicle for testing and (i-2) at least one piece of subject velocity information for testing thereof, which have been acquired from at least one of a GPS for testing and a velocity control unit for testing included in the subject vehicle for testing, and (i-3) at least one piece of surrounding location information for testing of at least part of surrounding vehicles for testing among the surrounding objects for testing and (i-4) at least one piece of surrounding velocity information for testing thereof, which have been acquired by referring to at least one driving video for testing recorded through at least one subject camera for testing on the subject vehicle for testing during the test subject time range for verification, and (ii) generating the trajectory vector for testing by referring to the test route information for verification, corresponding to the driving route for testing of the subject vehicle for testing on a test region map for verification during the test subject time range for verification, which has been acquired from a planning unit for testing included in the subject vehicle for testing.

As one example, at the process of (I), the processor performs processes of (i) generating the status vector for testing by using the test circumstance information for verification, including (i-1) at least one piece of subject location information for testing of the subject vehicle for testing and (i-2) at least one piece of subject velocity information for testing thereof, which have been acquired from at least one of a GPS for testing and a velocity control unit for testing included in the subject vehicle for testing, and (i-3) at least one piece of surrounding location information for testing of at least part of surrounding vehicles for testing among the surrounding objects for testing and (i-4) at least one piece of surrounding velocity information for testing thereof, which have been acquired by using a V2X communication module for testing included in the subject vehicle of testing during the test subject time range for verification, and (ii) generating the trajectory vector for testing by referring to the test route information for verification, corresponding to the driving route for testing of the subject vehicle for testing on a test region map for verification during the test subject time range for verification, which has been acquired from a planning unit for testing included in the subject vehicle for testing.

As one example, the processor further performs a process of: III) instructing the subject vehicle for testing to switch its driving mode to an autonomous driving mode if the predicted collision probability for testing is larger than a threshold and a driving mode of the subject vehicle for testing corresponds to a manual driving mode.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
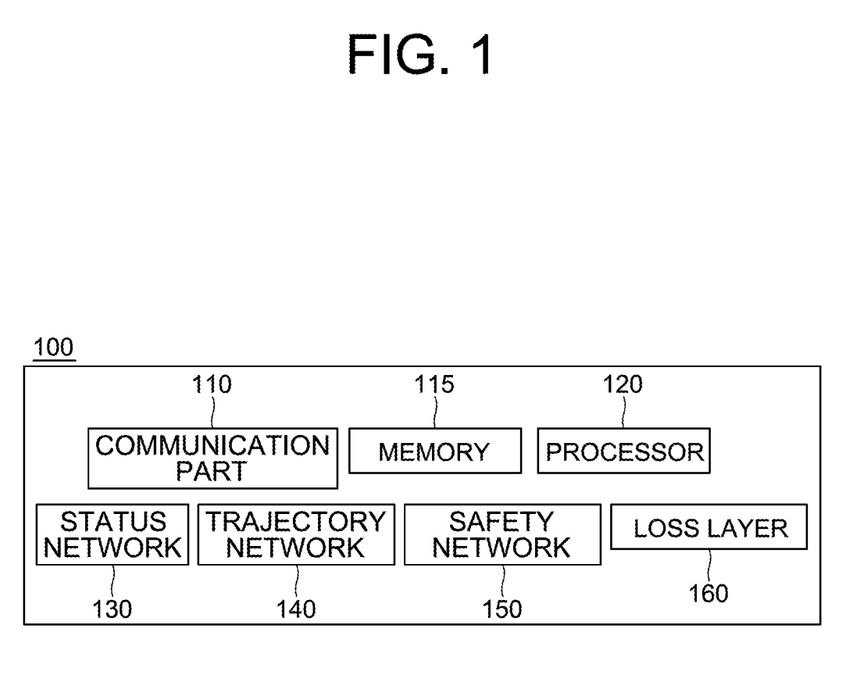
FIG. 1 is a drawing schematically illustrating a configuration of a learning device performing a learning method for calculating a collision probability, to be used for determining whether it is appropriate or not to switch driving modes of a vehicle capable of an autonomous driving, by analyzing a recent driving route of a driver with regard to a circumstance of its corresponding time range, in accordance with one example embodiment of the present disclosure.

FIG. 1 is a drawing schematically illustrating a configuration of a learning device performing a learning method for calculating a collision probability, to be used for determining whether it is appropriate or not to switch driving modes of a vehicle capable of an autonomous driving, by analyzing a recent driving route of a driver with regard to a circumstance of its corresponding time range, in accordance with one example embodiment of the present disclosure.

By referring to FIG. 1, the learning device 100 may include at least one status network 130, at least one trajectory network 140, at least one safety network 150 and at least one loss layer 160, to be described later. Processes of input/output and computations of the status network 130, the trajectory network 140, the safety network 150 and the loss layer 160 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

Figure 2:
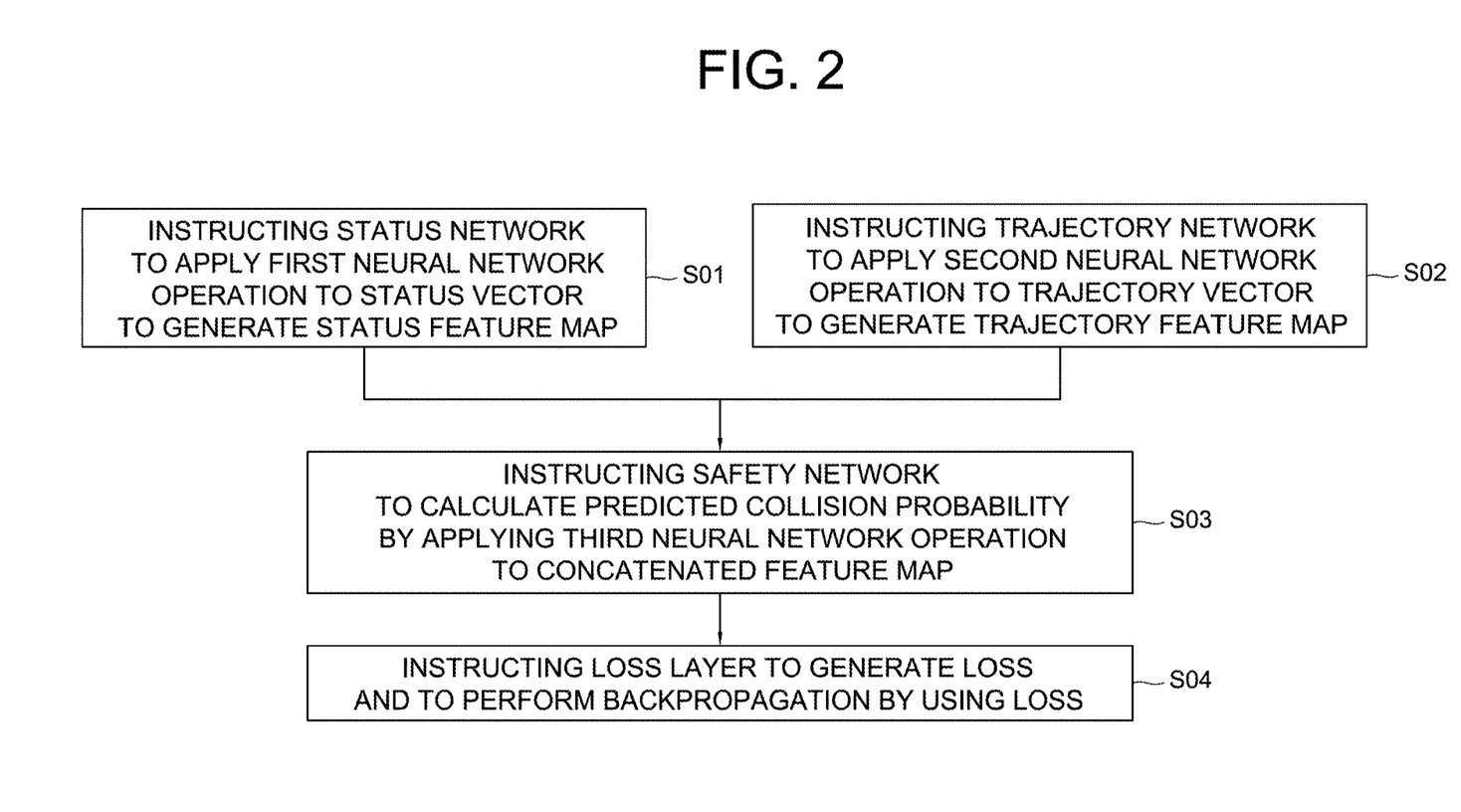
FIG. 2 is a flow chart schematically illustrating the learning method for calculating the collision probability, to be used for determining whether it is appropriate or not to switch the driving modes of the vehicle capable of the autonomous driving, by analyzing the recent driving route of the driver with regard to the circumstance of its corresponding time range, in accordance with one example embodiment of the present disclosure.

In order to explain an example of the learning method for calculating the collision probability, to be used for determining whether it is appropriate or not to switch the driving modes of the vehicle capable of the autonomous driving, by analyzing the recent driving route of the driver with regard to the circumstance of its corresponding time range, FIG. 2 will be referred to.

FIG. 2 is a flow chart schematically illustrating the learning method for calculating the collision probability, to be used for determining whether it is appropriate or not to switch the driving modes of the vehicle capable of the autonomous driving, by analyzing the recent driving route of the driver with regard to the circumstance of its corresponding time range, in accordance with one example embodiment of the present disclosure.

By referring to FIG. 2, at steps of S01 and S02, the learning device 100 may perform processes of (i) instructing the status network 130 to apply at least one first neural network operation to at least one status vector, to be explained later, to thereby generate at least one status feature map and (ii) instructing the trajectory network 140 to apply at least one second neural network operation to at least one trajectory vector, to be explained later, to thereby generate at least one trajectory feature map. Such two processes corresponding to the steps of S01 and S02 are independent from each other, thus any of the two can be performed first, or those two can be performed in parallel. Thereafter, at a step of S03, the learning device 100 may instruct the safety network 150 to calculate a predicted collision probability, to be explained later, by applying at least one third neural network operation to a concatenated feature map including information on the status feature map and the trajectory feature map. And, at a step of S04, the learning device 100 may instruct the loss layer 160 to generate at least one loss by referring to the predicted collision probability and at least one Ground-Truth (GT) collision probability and to perform backpropagation by using the loss, to thereby learn at least part of parameters of the safety network 150, the trajectory network 140 and the status network 130.

A brief explanation on how the learning device 100 performs the learning method of the present disclosure has been presented above. Below, it will be explained specifically, after how the status vector, the trajectory vector and the GT collision probability are acquired is explained.

First, the status vector is a vector corresponding to at least one piece of circumstance information for verification, including at least part of at least one piece of subject motion information on at least one subject vehicle interworking with the learning device 100, and one or more pieces of surrounding motion information, which include information on one or more motions of at least part of one or more surrounding objects located closer than a threshold from the subject vehicle, in a subject time range for verification from a first timing to a T-th timing. Herein, T is a specific arbitrary integer. The subject motion information, as an example, may include at least one piece of subject location information of the subject vehicle and at least one piece of subject velocity information thereof. And, said surrounding motion information, also as an example, may include at least one piece of surrounding location information of at least part of surrounding objects, which are located closer than a threshold from the subject vehicle, and at least one piece of surrounding velocity information thereof. As another example, the subject motion information may further include at least one piece of subject acceleration information of the subject vehicle corresponding to the subject time range for verification, and the surrounding motion information may also further include at least one piece of surrounding acceleration information of at least part of the surrounding objects. Below, it will be explained under a supposition that the subject motion information does not include the subject acceleration information and the surrounding motion information does not include the surrounding acceleration information, but a person in the art may be able to use the learning method of the present disclosure for a case that each of the subject motion information and the surrounding motion information includes its corresponding acceleration information, by referring to explanations to be shown below.

Second, the trajectory vector may be a vector corresponding to at least one piece of route information for verification on at least one driving route driven by the subject vehicle in the subject time range for verification. For example, the route information for verification may include information on a first specific timing among the first timing to the T-th timing when the subject vehicle has switched its driving lane, or information on a second specific timing among the first timing to the T-th timing when the subject vehicle has turn right or left.

The circumstance information for verification, corresponding to the status vector, and the route information for verification, corresponding to the trajectory vector, may be acquired by using example embodiments for each of cases to be shown below, but a scope of the present disclosure may not be limited thereto.

First, a first example embodiment may relate to a first case that the subject vehicle and surrounding vehicles, among the surrounding objects, are capable of a V2X communication, thus have been constantly transmitting their own motion information to a basement server. In the first case, the learning device 100 may acquire the circumstance information for verification corresponding to the subject time range for verification, by referring to at least part of (i) the subject motion information including the subject location information and the subject velocity information, and (ii) the surrounding motion information including the surrounding location information and the surrounding velocity information, which have been acquired from the basement server. Also, the learning device 100 may acquire the route information for verification by referring to information on the driving route of the subject vehicle on a region map for verification, acquired from the basement server.

And, a second example embodiment may relate to a second case that the subject vehicle has performed an autonomous driving based on an image processing, but the subject vehicle and the surrounding vehicles do not have transmitted their own motion information to the basement server. In this case, the learning device 100 may acquire (i) the subject motion information by referring to at least one piece of driving record information of the subject vehicle, which has been recorded during the autonomous driving in the subject time range for verification, and (ii) the surrounding motion information by referring to at least one driving video recorded through at least one subject camera on the subject vehicle during the subject time range for verification. Herein, by acquiring the subject motion information and the surrounding motion information, the circumstance information for verification can be acquired, since it includes those two.

Further, the subject motion information can be acquired by referring to the driving record information because it may be including information on how fast the subject vehicle has driven in each of timings in the subject time range for verification and information on where the subject vehicle has been located in said each of the timings by using a GPS.

Also, the surrounding motion information can be acquired by referring to the driving video, if (i) an object detection operation using a Convolutional Neural Network (CNN), (ii) a distance estimation operation, and (iii) a velocity estimation operation are applied to the driving video.

Herein, the distance estimation operation can be used for calculating distances between the surrounding objects on frames of the driving video and the subject vehicle, and it can be performed by using a relationship among a principal point, a vanishing point and a focal point and an angle between optical axis of the subject camera and a ground. Also, the velocity estimation operation can be used for calculating speeds of the surrounding objects, and it can be performed by referring to the subject velocity information and information on how the surrounding objects have moved between the frames.

Specifically, as the object detection operation is performed, at least part of the surrounding objects can be detected in the driving video. Thereafter, the distance estimation operation can be performed to calculate distances of the surrounding objects, and the distances can be used, along with the subject location information, to generate the surrounding location information. Also, the velocity estimation operation can be performed to generate the surrounding velocity information. The object detection operation, the distance estimation operation and the velocity estimation operation are well-known prior arts, thus a person in the art may be able to use those to acquire the surrounding motion information.

Meanwhile, the learning device 100 may acquire the route information for verification by referring to the driving record information, since it may include information on steering angles in which the subject vehicle has been driven, along with aforementioned information included therein.

Next, a third example embodiment may relate to a third case that the subject vehicle and the surrounding vehicles share their own motion information through the V2X communication. In this case, the learning device 100 may acquire the subject motion information by referring to the driving record information similarly to the second example embodiment, and may acquire the surrounding motion information, by referring to information on motions of at least part of the surrounding vehicles which has been acquired by using at least one V2X communication module installed to the subject vehicle. Also, similarly to the second example embodiment, the learning device 100 may acquire the route information for verification by referring to the driving record information stored in the subject vehicle.

Finally, a fourth example embodiment may relate to a fourth case that the subject vehicle and the surrounding objects have been simulated in at least one virtual world generated by a simulating device. Herein, the virtual world can be simulated by using any of simulating algorithms. In this case, the simulating device may include the subject location information and the subject velocity information, the surrounding location information and the surrounding velocity information may have been saved in the simulating device, and how the subject vehicle has driven may have been saved therein too, thus the learning device 100 may acquire the circumstance information for verification and the route information for verification from the simulating device.

Other than the example embodiments, as a fifth example embodiment, a manager may be able to just generate the circumstance information for verification and the route information for verification arbitrarily.

After the circumstance information for verification and the route information for verification are acquired, the learning device 100 may generate the status vector and the trajectory vector by using those. The status vector may be generated by setting each pieces of the subject location information, the subject velocity information, the surrounding location information and the surrounding velocity information, corresponding to each of the timings in the subject time range for verification, as its components. Also, the trajectory vector may be generated by setting each of pieces of information on actions committed by the subject vehicle and relative locations of the subject vehicle, included in the route information for verification, at each of the timings in the subject time range, such as switching lanes or turning, as its components.

Below, an explanation on how to acquire the GT collision probability will be presented. The GT collision probability may be acquired by referring to accident information on whether the subject vehicle has had at least one accident in an attention time range from a (T+1)-th timing to a (T+K)-th timing or not. Herein, K is an arbitrary integer. That is, the accident information may represent whether the driving route corresponding to the trajectory vector in a circumstance corresponding to the status vector has caused the accident or not. In said first case, the accident information may be acquired from the basement server. In said second and third cases, it may be acquired by referring to the driving record information. In said fourth case, it may have been stored in the simulating device, thus it may be acquired by communicating with the simulating device. In a fifth case corresponding to the fifth example embodiment, a manager may be able to just generate the accident information arbitrarily.

After the status vector, the trajectory vector and the GT collision probability are acquired, the learning device 100 may perform the processes of (i) instructing the status network 130 to apply the first neural network operation to the status vector, to thereby generate the status feature map, and (ii) instructing the trajectory network 140 to apply the second neural network operation to the trajectory vector, to thereby generate the trajectory feature map. Thereafter, the concatenated feature map is acquired, the learning device 100 may instruct the safety network 150 to apply the third neural network operation to the concatenated feature map, to thereby calculate the predicted collision probability, representing a predicted probability of an occurrence of the accident caused by the driving route with regard to the circumstance. To be more specific, configurations of the status network 130, the trajectory network 140 and the safety network 150 may be explained by referring to FIG. 3.

Figure 3:
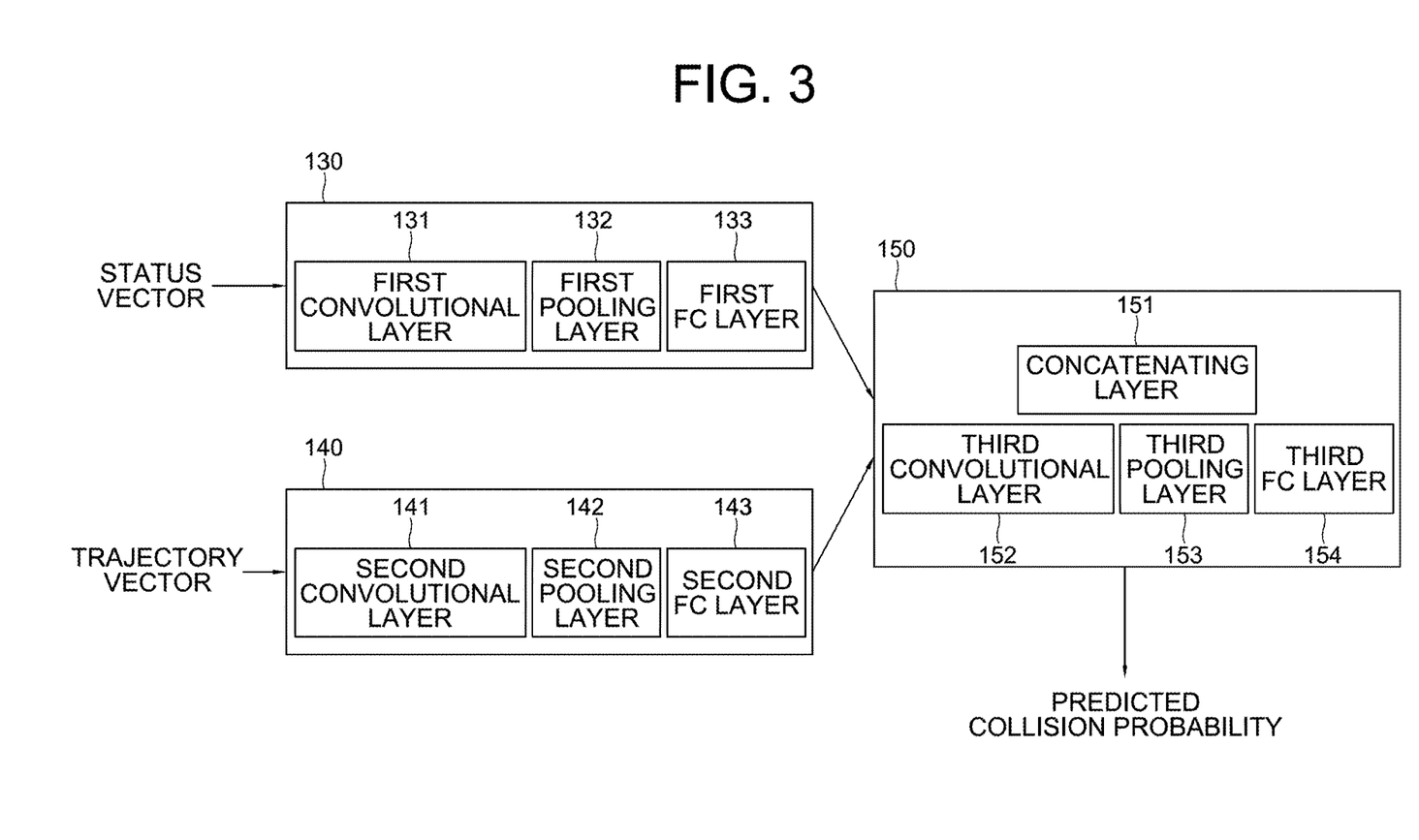
FIG. 3 is a drawing schematically illustrating an example of configurations of a status network, a trajectory network and a safety network to be used for performing the learning method for calculating the collision probability, to be used for determining whether it is appropriate or not to switch the driving modes of the vehicle capable of the autonomous driving, by analyzing the recent driving route of the driver with regard to the circumstance of its corresponding time range, in accordance with one example embodiment of the present disclosure.

FIG. 3 is a drawing schematically illustrating an example of configurations of the status network 130, the trajectory network 140 and the safety network 150 to be used for performing the learning method for calculating the collision probability, to be used for determining whether it is appropriate or not to switch the driving modes of the vehicle capable of the autonomous driving, by analyzing the recent driving route of the driver with regard to the circumstance of its corresponding time range, in accordance with one example embodiment of the present disclosure.

By referring to FIG. 3, the status network 130 may include a first convolutional layer 131, a first pooling layer 132 and a first Fully-Connected (FC) layer 133. Herein, the learning device 100 may instruct the first convolutional layer 131 to generate at least one (1-1)-st feature map by applying at least one first convolutional operation to the status vector. Thereafter, the learning device 100 may instruct the first pooling layer 132 to generate at least one (1-2)-nd feature map by applying at least one first pooling operation to the (1-1)-st feature map, and may instruct the first FC layer 133 to generate the status feature map by applying at least one first FC operation to the (1-2)-nd feature map. As an example, the first convolutional operation may be performed by using a one-dimensional convolutional filter, and the first pooling operation may be a global pooling operation to be used for pooling information on pairs of multiple status vectors and multiple trajectory vectors, but the scope of the present disclosure may not be limited thereto.

And, by again referring to FIG. 3, the trajectory network 140 may include a second convolutional layer 141, a second pooling layer 142 and a second FC layer 143. Herein, the learning device 100 may instruct the second convolutional layer 141 to generate at least one (2-1)-st feature map by applying at least one second convolutional operation to the trajectory vector. Thereafter, the learning device 100 may instruct the second pooling layer 142 to generate at least one (2-2)-nd feature map by applying at least one second pooling operation to the (2-1)-st feature map, and may instruct the second FC layer 143 to generate the trajectory feature map by applying at least one second FC operation to the (2-2)-nd feature map. Also, as an example, the second convolutional operation may be performed by using the one-dimensional convolutional filter, and the second pooling operation may be the global pooling operation, but the scope of the present disclosure may not be limited thereto.

Finally, by again referring to FIG. 3, the safety network may include a concatenating layer 151, a third convolutional layer 152, a third pooling layer 153 and a third FC layer 154. Herein, the learning device 100 may instruct the concatenating layer 151 to concatenate the status feature map and the trajectory feature map, to thereby generate the concatenated feature map. The status feature map and the trajectory feature map may be concatenated channel-wise, but the scope of the present disclosure may not be limited thereto. Thereafter, the learning device 100 may instruct the third convolutional layer 152 to generate at least one (3-1)-st feature map by applying at least one third convolutional operation to the concatenated feature map. Then, the learning device 100 may instruct the third pooling layer 153 to generate at least one (3-2)-nd feature map by applying at least one third pooling operation to the (3-1)-st feature map, and may instruct the third FC layer 154 to generate said at least one predicted collision probability by applying at least one third FC operation to the (3-2)-nd feature map.

Thereafter, the learning device 100 may instruct the loss layer 160 to generate the loss by referring to the predicted collision probability and the GT collision probability, and to perform backpropagation by using the loss, to thereby learn at least part of the parameters of the safety network 150, the trajectory network 140 and the status network 130.

Learning processes of the safety network 150, the trajectory network 140 and the status network 130 have been explained as shown above. Below, an explanation on testing processes of the present disclosure will be presented.

That is, on condition that (1) the learning device 100, if (i) at least one status vector for training, corresponding to at least one piece of circumstance information for verification for training including at least part of (i-1) at least one piece of subject motion information for training on at least one subject vehicle for training and (i-2) one or more pieces of surrounding motion information for training on at least part of one or more surrounding objects for training located closer than a threshold from the subject vehicle for training, in a subject time range for verification for training from the first timing to the T-th timing, and (ii) at least one trajectory vector for training, corresponding to at least one piece of route information for verification for training on at least one driving route for training driven by the subject vehicle for training in the subject time range for verification for training, have been acquired, has performed processes of (i) instructing the status network 130 to apply the first neural network operation to the status vector for training, to thereby generate at least one status feature map for training and (ii) instructing the trajectory network 140 to apply the second neural network operation to the trajectory vector for training, to thereby generate at least one trajectory feature map for training; (2) the learning device 100, if at least one concatenated feature map for training corresponding to the status feature map for training and the trajectory feature map for training has been acquired, has instructed the safety network 150 to apply the third neural network operation to the concatenated feature map for training, to thereby calculate at least one predicted collision probability for training representing a predicted probability for training of an occurrence of at least one accident for training caused by the driving route for training indicated by the route information for verification for training with regard to a circumstance for training indicated by the circumstance information for verification for training; and (3) the learning device 100 has instructed the loss layer 160 to generate at least one loss by referring to the predicted collision probability for training and at least one GT collision probability, which have been acquired beforehand, and to perform backpropagation by using the loss, to thereby learn at least part of parameters of the safety network 150, the trajectory network 140 and the status network 130, a testing device, if (i) at least one status vector for testing, corresponding to at least one piece of test circumstance information for verification including at least part of (i-1) at least one piece of subject motion information for testing on at least one subject vehicle for testing and (i-2) one or more pieces of surrounding motion information for testing on at least part of one or more surrounding objects for testing located closer than the threshold from the subject vehicle for testing, in a test subject time range for verification from a 1'-st timing to a T'-th timing, and (ii) at least one trajectory vector for testing, corresponding to at least one piece of test route information for verification on at least one driving route for testing driven by the subject vehicle for testing in the test subject time range for verification, have been acquired, may perform processes of (i) instructing the status network 130 to apply the first neural network operation to the status vector for testing, to thereby generate at least one status feature map for testing and (ii) instructing the trajectory network 140 to apply the second neural network operation to the trajectory vector for testing, to thereby generate at least one trajectory feature map for testing.

Thereafter, the testing device, if at least one concatenated feature map for testing corresponding to the status feature map for testing and the trajectory feature map for testing has been acquired, may instruct the safety network 150 to apply the third neural network operation to the concatenated feature map for testing, to thereby calculate at least one predicted collision probability for testing representing a predicted probability for testing of an occurrence of at least one accident for testing caused by the driving route for testing indicated by the test route information for verification with regard to a circumstance for testing indicated by the test circumstance information for verification.

Herein, assume a case that the subject vehicle for testing and surrounding vehicles for testing, among the surrounding objects for testing, are capable of a V2X communication for testing, thus have been constantly transmitting their own motion information for testing to the basement server for testing. Then, the testing device may communicate with the basement server for testing interworking with the subject vehicle for testing, to perform processes of (i) generating the status vector for testing by using the test circumstance information for verification, which has been acquired from the basement server for testing, and (ii) generating the trajectory vector for testing by referring to the test route information for verification, which has been acquired from the basement server for testing.

Or, assume another case that the subject vehicle for testing has performed an autonomous driving based on an image processing, but the subject vehicle for testing and the surrounding vehicles for testing do not have transmitted their own motion information for testing to the basement server for testing or communicate with each other. Then, the testing device may perform processes of (i) generating the status vector for testing by using the test circumstance information for verification corresponding to the test subject time range for verification, including the subject motion information for testing, which has been acquired from at least one of a GPS for testing and a velocity control unit for testing included in the subject vehicle for testing, and the surrounding motion information for testing, which has been acquired by referring to at least one driving video for testing recorded through at least one subject camera for testing on the subject vehicle for testing during the test subject time range for verification, and (ii) generating the trajectory vector for testing by referring to the test route information for verification, which has been acquired from a planning unit for testing included in the subject vehicle for testing. Herein, the velocity control for testing and the planning unit may be included in the subject vehicle, and may interwork with an Electronic Control Unit (ECU) of the subject vehicle.

Further, assume still another case that the subject vehicle for testing and the surrounding vehicles for testing share their own motion information for testing through the V2X communication. Then, the testing device may perform processes of (i) generating the status vector for testing by using the test circumstance information for verification corresponding to the test subject time range for verification, including the subject motion information for testing, which has been acquired from at least one of the GPS for testing and the velocity control unit for testing included in the subject vehicle for testing, and the surrounding motion information for testing, which have been acquired by using a V2X communication module for testing included in the subject vehicle of testing during the test subject time range for verification, and (ii) generating the trajectory vector for testing by referring to the test route information for verification, which has been acquired from the planning unit for testing included in the subject vehicle for testing.

After the status vector for testing and the trajectory vector for testing are generated by using the test circumstance information for verification and the test route information for verification, those may be processed by the status network, the trajectory network and the safety network, to calculate the predicted collision probability for testing.

Thereafter, the testing device, if the predicted collision probability for testing is larger than a threshold, and a driving mode of the subject vehicle for testing corresponds to a manual driving mode, may instruct the subject vehicle for testing to switch its driving mode to an autonomous driving mode.

By using the method of the present disclosure, accidents can be prevented, because control of the subject vehicle for testing can be taken from a subject driver for testing who drives dangerously.

The present disclosure has an effect of providing the learning method for analyzing a recent driving route of a driver, to thereby calculate a collision probability.

The present disclosure has another effect of providing the learning method for calculating a collision probability by analyzing a recent driving route of a driver, to thereby determine whether the driver is driving dangerously or not by referring to the collision probability.

The present disclosure has still another effect of improving a road circumstance by providing the method for switching a mode of a vehicle from a manual driving mode to an autonomous driving mode if a driver drives recklessly.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for calculating collision probability comprising:

(a) providing a learning device configured to acquire (i) at least one status vector, corresponding to at least one piece of circumstance information for verification including at least part of (i-1) at least one piece of subject motion information on at least one subject vehicle and (i-2) one or more pieces of surrounding motion information on at least part of one or more surrounding objects located closer than a threshold from the subject vehicle, in a subject time range for verification from a first timing to a T-th timing, and (ii) at least one trajectory vector, corresponding to at least one piece of route information for verification on at least one driving route driven by the subject vehicle in the subject time range for verification, and then to perform processes of (i) instructing a status network to apply at least one first neural network operation to the status vector, to thereby generate at least one status feature map and (ii) instructing a trajectory network to apply at least one second neural network operation to the trajectory vector, to thereby generate at least one trajectory feature map;

(b) the learning device is further configured to acquire at least one concatenated feature map corresponding to the status feature map and the trajectory feature map, and then to instruct a safety network to apply at least one third neural network operation to the concatenated feature map, to thereby calculate at least one predicted collision probability representing a predicted probability of an occurrence of at least one accident caused by the driving route indicated by the route information for verification with regard to a circumstance indicated by the circumstance information for verification; and (c) the learning device is further configured to instruct a loss layer to generate at least one loss by referring to the predicted collision probability and at least one Ground-Truth (GT) collision probability, which have been acquired beforehand, and to perform backpropagation by using the loss, to thereby learn at least part of parameters of the safety network, the trajectory network and the status network.

2. The method of claim 1, wherein, at the step of (a), the learning device instructs (i) at least one first convolutional layer of the status network to generate at least one (1-1)-st feature map by applying at least one first convolutional operation to the status vector, (ii) at least one first pooling layer of the status network to generate at least one (1-2)-nd feature map by applying at least one first pooling operation to the (1-1)-st feature map, and (iii) at least one first Fully-Connected (FC) layer to generate the status feature map by applying at least one first FC operation to the (1-2)-nd feature map.

3. The method of claim 1, wherein, at the step of (a), the learning device instructs (i) at least one second convolutional layer of the trajectory network to generate at least one (2-1)-st feature map by applying at least one second convolutional operation to the trajectory vector, (ii) at least one second pooling layer of the trajectory network to generate at least one (2-2)-nd feature map by applying at least one second pooling operation to the (2-1)-st feature map, and (iii) at least one second Fully-Connected (FC) layer to generate the trajectory feature map by applying at least one second FC operation to the (2-2)-nd feature map.

4. The method of claim 1, wherein, at the step of (b), the learning device instructs (i) at least one concatenating layer to generate the concatenated feature map by concatenating the status feature map and the trajectory feature map, (ii) at least one third convolutional layer of the safety network to generate at least one (3-1)-st feature map by applying at least one third convolutional operation to the concatenated feature map, (iii) at least one third pooling layer of the safety network to generate at least one (3-2)-nd feature map by applying at least one third pooling operation to the (3-1)-st feature map, and (iv) at least one third Fully-Connected (FC) layer to generate the predicted collision probability by applying at least one third FC operation to the (3-2)-nd feature map.

5. The method of claim 1, before the step of (a), further comprising a step of:
(a0) the learning device communicating with at least one basement server interworking with the subject vehicle, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the basement server, (ii) generating the trajectory vector by using the route information for verification, corresponding to the driving route of the subject vehicle on a region map for verification during the subject time range for verification, which has been acquired from the basement server, and (iii) acquiring the GT collision probability by using at least one piece of accident information on whether the subject vehicle has had at least one accident in an attention time range from a (T+1)-th timing to a (T+K)-th timing or not, which has been acquired from the basement server, wherein K is at least one arbitrary integer.

6. The method of claim 1, before the step of (a), further comprising a step of:
(a1) the learning device performs processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by referring to at least one driving video recorded through at least one subject camera on the subject vehicle during the subject time range for verification, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicles has had at least one accident in an attention time range from a (T+1)-th timing to a (T+K)-th timing or not, which has been acquired by referring to the driving record information, wherein K is at least one arbitrary integer.

7. The method of claim 1, before the step of (a), further comprising a step of:

(a2) the learning device performs processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by using at least one V2X communication module installed to the subject vehicle, to be used for communicating with said at least part of the surrounding vehicles, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicle has had at least one accident in an attention time range from a (T+1)-th timing to a (T+K)-th timing or not, which has been acquired by referring to the driving record information, wherein K is at least one arbitrary integer.

8. The method of claim 1, before the step of (a), further comprising a step of:
(a3) the learning device communicating with at least one simulating device simulating at least one virtual world including the subject vehicle and the surrounding objects, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the simulating device, (ii) generating the trajectory vector by referring to the route information for verification, corresponding to the driving route of the subject vehicle on a region map for verification during the subject time range for verification, which has been acquired from the simulating device, and (iii) acquiring the GT collision probability by using at least one piece of accident information on whether the subject vehicle has had at least one accident in an attention time range from a (T+1)-th timing to a (T+K)-th timing or not, which has been acquired from the simulating device, wherein K is at least one arbitrary integer.

9. The method of claim 1, wherein the subject motion information includes at least part of (i-1) at least one piece of subject location information of the subject vehicle, (i-2) at least one piece of subject velocity information thereof, and (i-3) at least one piece of subject acceleration information thereof, and
wherein the surrounding motion information includes at least part of (ii-1) at least one piece of surrounding location information of at least part of the surrounding objects, (ii-2) at least one piece of surrounding velocity information thereof, and (ii-3) at least one piece of surrounding acceleration information thereof.

10. A learning device for calculating collision probability comprising:
at least one memory that stores instructions; and
at least one processor configured to execute the instructions to perform processes of: (I) acquiring (i) at least one status vector, corresponding to at least one piece of circumstance information for verification including at least part of (i-1) at least one piece of subject motion information on at least one subject vehicle and (i-2) one or more pieces of surrounding motion information on at least part of one or more surrounding objects located closer than a threshold from the subject vehicle, in a subject time range for verification from a first timing to a T-th timing, and (ii) at least one trajectory vector, corresponding to at least one piece of route information for verification on at least one driving route driven by the subject vehicle in the subject time range for verification, and then performing processes of (i) instructing a status network to apply at least one first neural network operation to the status vector, to thereby generate at least one status feature map and (ii) instructing a trajectory network to apply at least one second neural network operation to the trajectory vector, to thereby generate at least one trajectory feature map; (II) wherein the processor is further configured to acquire at least one concatenated feature map corresponding to the status feature map and the trajectory feature map, and further wherein the processor then performs the process of instructing a safety network to apply at least one third neural network operation to the concatenated feature map, to thereby calculate at least one predicted collision probability representing a predicted probability of an occurrence of at least one accident caused by the driving route indicated by the route information for verification with regard to a circumstance indicated by the circumstance information for verification; and (III) instructing a loss layer to generate at least one loss by referring to the predicted collision probability and at least one Ground-Truth (GT) collision probability, which have been acquired beforehand, and to perform backpropagation by using the loss, to thereby learn at least part of parameters of the safety network, the trajectory network and the status network.

11. The device of claim 10, wherein, at the process of (I), the processor instructs (i) at least one first convolutional layer of the status network to generate at least one (1-1)-st feature map by applying at least one first convolutional operation to the status vector, (ii) at least one first pooling layer of the status network to generate at least one (1-2)-nd feature map by applying at least one first pooling operation to the (1-1)-st feature map, and (iii) at least one first Fully-Connected (FC) layer to generate the status feature map by applying at least one first FC operation to the (1-2)-nd feature map.

12. The device of claim 10, wherein, at the process of (I), the processor instructs (i) at least one second convolutional layer of the trajectory network to generate at least one (2-1)-st feature map by applying at least one second convolutional operation to the trajectory vector, (ii) at least one second pooling layer of the trajectory network to generate at least one (2-2)-nd feature map by applying at least one second pooling operation to the (2-1)-st feature map, and (iii) at least one second Fully-Connected (FC) layer to generate the trajectory feature map by applying at least one second FC operation to the (2-2)-nd feature map.

13. The device of claim 10, wherein, at the process of (II), the processor instructs (i) at least one concatenating layer to generate the concatenated feature map by concatenating the status feature map and the trajectory feature map, (ii) at least one third convolutional layer of the safety network to generate at least one (3-1)-st feature map by applying at least one third convolutional operation to the concatenated feature map, (iii) at least one third pooling layer of the safety network to generate at least one (3-2)-nd feature map by applying at least one third pooling operation to the (3-1)-st feature map, and (iv) at least one third Fully-Connected (FC) layer to generate the predicted collision probability by applying at least one third FC operation to the (3-2)-nd feature map.

14. The device of claim 10, wherein, before the process of (I), the processor further performs a process of:
(I0) communicating with at least one basement server interworking with the subject vehicle, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the basement server, (ii) generating the trajectory vector by using the route information for verification, corresponding to the driving route of the subject vehicle on a region map for verification during the subject time range for verification, which has been acquired from the basement server, and (iii) acquiring the GT collision probability by using at least one piece of accident information on whether the subject vehicle has had at least one accident in an attention time range from a (T+1)-th timing to a (T+K)-th timing or not, which has been acquired from the basement server, wherein K is at least one arbitrary integer.

15. The device of claim 10, wherein, before the process of (I), the processor further performs a process of:
(I1) performing processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by referring to at least one driving video recorded through at least one subject camera on the subject vehicle during the subject time range for verification, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicles has had at least one accident in an attention time range from a (T+1)-th timing to a (T+K)-th timing or not, which has been acquired by referring to the driving record information, wherein K is at least one arbitrary integer.

16. The device of claim 10, wherein, before the process of (I), the processor further performs a process of:
   (I2) performing processes of (i) generating the status vector by using the circumstance information for verification corresponding to the subject time range for verification, including (i-1) at least one piece of subject location information of the subject vehicle and (i-2) at least one piece of subject velocity information thereof, which have been acquired by referring to at least one piece of driving record information of the subject vehicle, and (i-3) at least one piece of surrounding location information of at least part of surrounding vehicles among the surrounding objects and (i-4) at least one piece of surrounding velocity information thereof, which have been acquired by using at least one V2X communication module installed to the subject vehicle, to be used for communicating with said at least part of the surrounding vehicles, (ii) generating the trajectory vector by referring to the route information for verification, corresponding to the driving route of the subject vehicle on a region map for verification during the subject time range for verification, which has been acquired by referring to the driving record information, and (iii) acquiring the GT collision probability by using accident information on whether the subject vehicle has had at least one accident in an attention time range from a (T+1)-th timing to a (T+K)-th timing or not, which has been acquired by referring to the driving record information, wherein K is at least one arbitrary integer.

17. The device of claim 10, wherein, before the process of (I), the processor further performs a process of:
   (I3) communicating with at least one simulating device simulating at least one virtual world including the subject vehicle and the surrounding objects, to perform processes of (i) generating the status vector by using the circumstance information for verification, including (i-1) at least one piece of subject location information of the subject vehicle, (i-2) at least one piece of subject velocity information thereof, (i-3) at least one piece of surrounding location information of at least part of surrounding vehicles among the surrounding objects and (i-4) at least one piece of surrounding velocity information thereof, corresponding to the subject time range for verification, which have been acquired from the simulating device, (ii) generating the trajectory vector by referring to the route information for verification, corresponding to the driving route of the subject vehicle on a region map for verification during the subject time range for verification, which has been acquired from the simulating device, and (iii) acquiring the GT collision probability by using at least one piece of accident information on whether the subject vehicle has had at least one accident in an attention time range from a (T+1)-th timing to a (T+K)-th timing or not, which has been acquired from the simulating device, wherein K is at least one arbitrary integer.

18. The device of claim 10, wherein the subject motion information includes at least part of (i-1) at least one piece of subject location information of the subject vehicle, (i-2) at least one piece of subject velocity information thereof, and (i-3) at least one piece of subject acceleration information thereof, and
   wherein the surrounding motion information includes at least part of (ii-1) at least one piece of surrounding location information of at least part of the surrounding objects, (ii-2) at least one piece of surrounding velocity information thereof, and (ii-3) at least one piece of surrounding acceleration information thereof.

* * * * *